(12) United States Patent
Kim

(10) Patent No.: US 9,266,019 B2
(45) Date of Patent: Feb. 23, 2016

(54) SAFETY SCHEME FOR GESTURE-BASED GAME

(75) Inventor: Seungil Kim, Seoul (KR)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 0 days.

(21) Appl. No.: 13/511,844

(22) PCT Filed: Jul. 1, 2011

(86) PCT No.: PCT/KR2011/004855
§ 371 (c)(1),
(2), (4) Date: May 24, 2012

(87) PCT Pub. No.: WO2013/005868
PCT Pub. Date: Jan. 10, 2013

(65) Prior Publication Data
US 2013/0005467 A1 Jan. 3, 2013

(51) Int. Cl.
*A63F 13/20* (2014.01)
*A63F 13/40* (2014.01)
*G06F 3/01* (2006.01)

(52) U.S. Cl.
CPC ............. *A63F 13/06* (2013.01); *A63F 13/10* (2013.01); *G06F 3/017* (2013.01); *A63F 2300/1093* (2013.01); *A63F 2300/305* (2013.01); *A63F 2300/643* (2013.01)

(58) Field of Classification Search
USPC ............................................ 463/31; 382/154
See application file for complete search history.

(56) References Cited

U.S. PATENT DOCUMENTS

| 5,900,849 | A | 5/1999 | Gallery |
| 6,663,491 | B2 | 12/2003 | Watabe et al. |
| 6,738,066 | B1 | 5/2004 | Nguyen |
| 7,489,265 | B2 | 2/2009 | Egri et al. |
| 7,702,608 | B1 | 4/2010 | Bererton et al. |
| RE41,414 | E | 7/2010 | Yamamoto |
| 8,162,754 | B2 | 4/2012 | Asami |
| 8,657,681 | B2 | 2/2014 | Kim |

(Continued)

FOREIGN PATENT DOCUMENTS

| CN | 201035741 Y | 3/2008 |
| CN | 101380520 A | 3/2009 |

(Continued)

OTHER PUBLICATIONS

International Search Report and Written Opinion from International Application No. PCT/KR2011/004855 mailed Apr. 4, 2012.

(Continued)

*Primary Examiner* — Paul A D'Agostino
*Assistant Examiner* — Ankit Doshi
(74) *Attorney, Agent, or Firm* — Brundidge & Stanger, P.C.

(57) ABSTRACT

Technologies are generally described for providing a notification to a player playing a gesture-based game of a potentially dangerous condition. In some examples, a safety component of a gesture-based game system includes a gesture range determination unit configured to determine a gesture range associated with a gesture-based game; a detection unit configured to detect a movement of an object; and an alarm unit configured to generate an alarm in response to a determination based on the movement of the object which is within the gesture range.

27 Claims, 9 Drawing Sheets

(56) References Cited

U.S. PATENT DOCUMENTS

| | | | |
|---|---|---|---|
| 9,020,239 | B2 | 4/2015 | Graepel et al. |
| 2007/0110298 | A1 | 5/2007 | Graepel et al. |
| 2008/0300055 | A1 | 12/2008 | Lutnick et al. |
| 2009/0027337 | A1* | 1/2009 | Hildreth .................. 345/158 |
| 2009/0077504 | A1 | 3/2009 | Bell et al. |
| 2009/0221368 | A1 | 9/2009 | Yen et al. |
| 2009/0221374 | A1 | 9/2009 | Yen et al. |
| 2010/0148977 | A1 | 6/2010 | Tseng et al. |
| 2010/0210359 | A1 | 8/2010 | Krzeslo et al. |
| 2010/0234094 | A1 | 9/2010 | Gagner et al. |
| 2010/0277411 | A1 | 11/2010 | Yee et al. |
| 2010/0306712 | A1 | 12/2010 | Snook et al. |
| 2011/0080490 | A1 | 4/2011 | Clarkson et al. |
| 2011/0119640 | A1 | 5/2011 | Berkes et al. |
| 2011/0185309 | A1 | 7/2011 | Challinor et al. |
| 2011/0190061 | A1 | 8/2011 | Takeda et al. |
| 2011/0193939 | A1* | 8/2011 | Vassigh et al. .............. 348/46 |
| 2011/0230263 | A1* | 9/2011 | Ng .......................... 463/31 |
| 2011/0300929 | A1 | 12/2011 | Tardif et al. |
| 2012/0122574 | A1* | 5/2012 | Fitzpatrick et al. ........ 463/31 |
| 2013/0260864 | A1 | 10/2013 | Gomez et al. |
| 2013/0293586 | A1 | 11/2013 | Kaino et al. |

FOREIGN PATENT DOCUMENTS

| | | | |
|---|---|---|---|
| CN | 101505841 | A | 8/2009 |
| JP | 10504917 | A | 5/1998 |
| JP | H11300049 | A | 11/1999 |
| JP | 2001299975 | A | 10/2001 |
| JP | 2006194887 | A | 7/2006 |
| JP | 2006344199 | A | 12/2006 |
| JP | 2007236696 | A | 9/2007 |
| JP | 2008178597 | A | 8/2008 |
| JP | 2009061180 | A | 3/2009 |
| JP | 2010-137097 | A | 6/2010 |
| JP | 2010257461 | A | 11/2010 |
| JP | 2010258774 | A | 11/2010 |
| JP | 2010534895 | A | 11/2010 |
| JP | 2011-189066 | A | 9/2011 |
| JP | 2012070781 | A | 4/2012 |
| JP | 2012155654 | A | 8/2012 |
| KR | 1020010095900 | A | 11/2001 |
| KR | 1020050047024 | A | 5/2005 |
| KR | 1020070032842 | A | 3/2007 |
| KR | 1020080069601 | A | 7/2008 |
| KR | 1020090090980 | A | 8/2009 |
| KR | 1020100032699 | A | 3/2010 |
| KR | 1020110047776 | A | 5/2011 |

OTHER PUBLICATIONS

International Search Report and Written Opinion for International Patent Application No. PCT/KR2011/006430 mailed Apr. 30, 2012.
Bee, J., "kinect fail," accessed at https://www.youtube.com/watch?v=qafmCU4LUZ8&feature=player_embedded, last Uploaded on Nov. 7, 2010, pp. 1-2.
"EyeToy Play + Camera (PS2)," Accessed at http://web.archive.org/web/20110101073338/http://www.dooyoo.co.uk/playstation-2-game/eyetoy-play-camera/, Accessed on Jan. 1, 2011, pp. 4.
International Search Report and Written Opinion for International Patent Application No. PCT/US2012/026515 mailed May 31, 2012.
International Search Report and Written Opinion for International Patent Application No. PCT/KR2011/009324 mailed Aug. 31, 2012.

* cited by examiner

Fig. 4
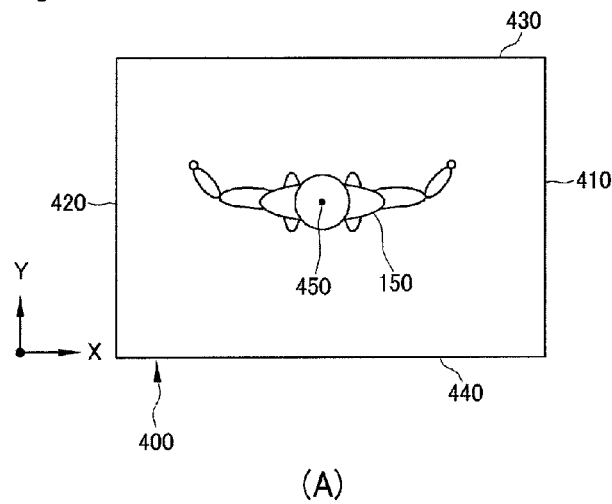
(A)
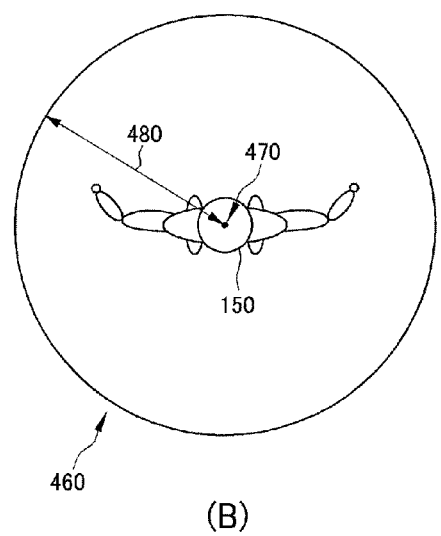
(B)
Fig. 5
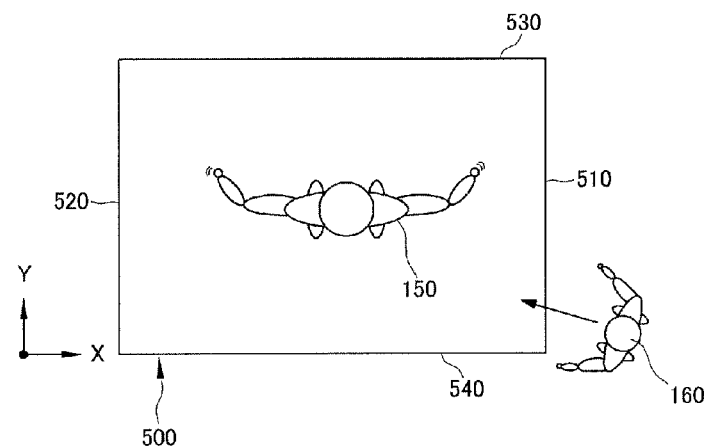

Fig. 6
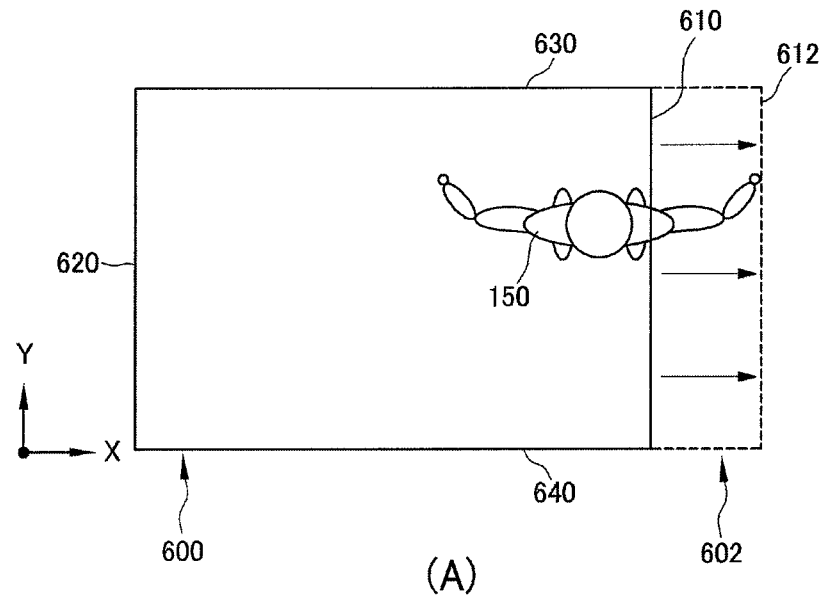
(A)
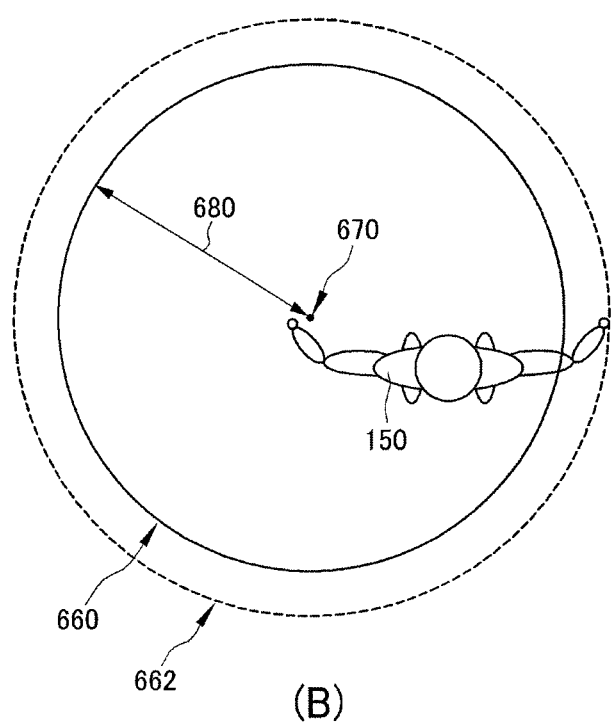
(B)

SAFETY SCHEME FOR GESTURE-BASED GAME

CROSS-REFERENCE TO RELATED APPLICATIONS

This Application is the National Stage filing under 35 U.S.C. §371 of PCT Application Ser. No. PCT/KR11/04855 filed on Jul. 1, 2011.

BACKGROUND

Camera technology and gesture recognition technology have experienced phenomenal growth in the last few years. Game devices have adopted such technologies. For example, a game device may recognize a gesture of a player using a camera and use the recognized gesture of the player as an input signal for playing a game. Game software developers have developed various types of gesture-based games for such game devices. Players can play the gesture-based games using their gestures (without using a keypad-type input device). There are, however, drawbacks to such gesture-based games. For example, a player of a gesture-based game may become engrossed in the game to the extent that the player fails to recognize an obstacle around the player or a spectator, a pet or another player approaching the player. In such cases, due to the player's drastic movements while engrossed in playing the game, collisions between the player and the obstacle or the spectator, pet or other player may occur.

SUMMARY

In an example, an apparatus comprises a gesture range determination unit configured to determine a gesture range associated with a gesture-based game, a detection unit configured to detect a movement of an object, and an alarm unit configured to generate an alarm in response to a determination based on the movement of the object which is within the gesture range.

In an example, a method comprises determining a gesture range associated with a gesture-based game, detecting a movement of an object during playing of the gesture-based game, determining that the object has moved into the gesture range during the playing of the gesture-based game and generating an alert in response to the determining that the object moved into the gesture range during the playing of the gesture-based game.

In an example, a computer-readable storage medium has stored thereon computer-executable instructions that, in response to execution, cause a system to perform operations, comprising determining a gesture range of a player of a gesture-based game, detecting a position of an object in a vicinity of the player during playing of the gesture-based game, and generating an alert in response to determining that the position of the object is within the gesture range.

In an example, a system, comprises means for determining a gesture range of a player associated with a gesture-based game, means for determining that an object is located within the gesture range during playing of the gesture-based game, and means for generating an alert in response to an output from the means for determining indicating that the object is located within the gesture range.

In an example, an apparatus comprises an identification unit configured to identify a type of a gesture-based game, a gesture range determination unit configured to determine a gesture range based on the type of the gesture-based game, and a detection unit configured to detect a movement of an object relative to the gesture range.

In an example, a method comprises identifying an identity of a gesture-based game being played on a gesture-based game system, determining a gesture range of a player associated with the gesture-based game based on the identity of the gesture-based game, and warning the player with at least one of a visual alert or an auditory alert in response to detecting a location of an object within the gesture range.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 4 schematically shows illustrative examples of determining a gesture range;

FIG. 5 schematically shows an illustrative example of detecting a movement of a spectator;

FIG. 6 schematically shows illustrative examples of updating a gesture range;

DETAILED DESCRIPTION

Figure 1:
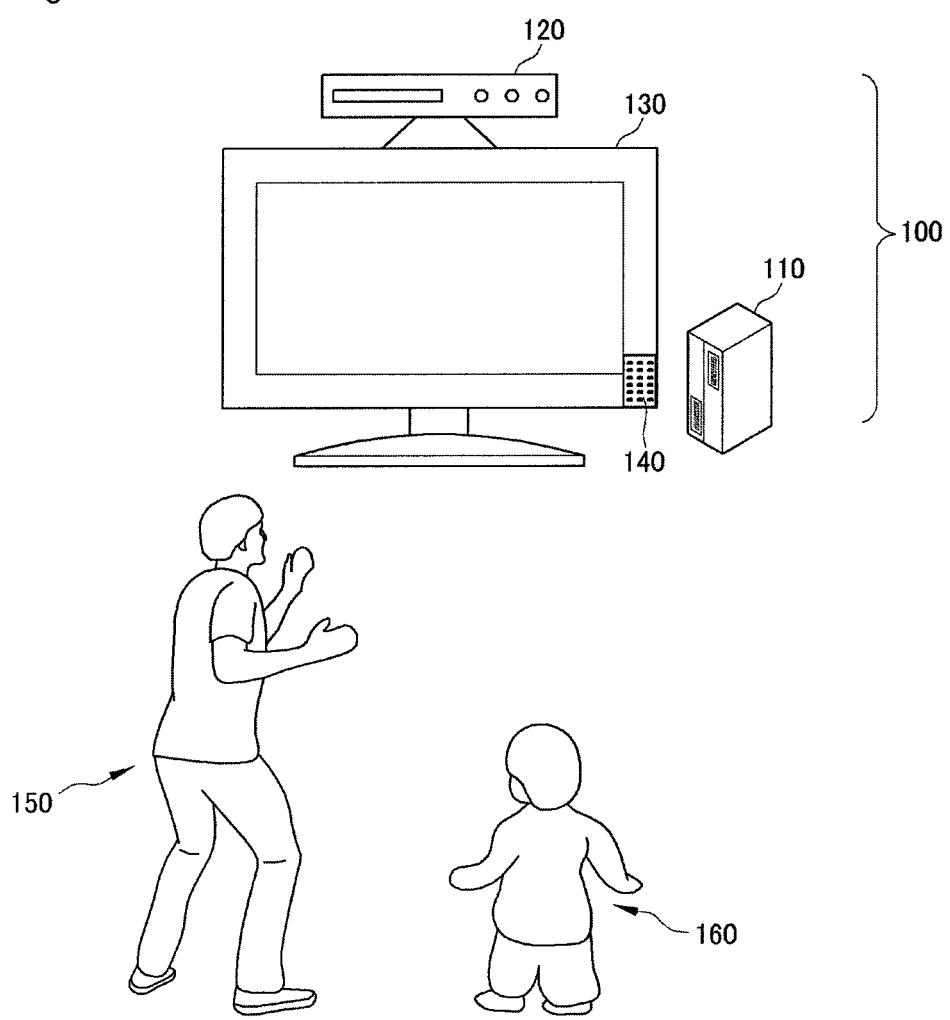
FIG. 1 schematically shows an illustrative example of an environment where a player is playing a gesture-based game and a spectator is watching the playing of the game in the vicinity of the player.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and computer program products related to a safety technique for gesture-based games.

Briefly stated, technologies are generally described for providing a notification to a player playing a gesture-based game of a potentially dangerous condition, such as when the player might strike a person or object by making a command gesture. In some examples, an alarm or alert is provided to a player playing a gesture-based game when an object moves into or comes within a player's gesture range during the playing of the gesture-based game. The object may come within a player's gesture range as a result of the object's movement, the player's movement, or a combination of both. Although the technology will be described herein as being implemented on or by a safety component of a gesture-based game system, in some embodiments, the technology may be implemented by a gesture-based game, other components of a gesture-based game system, or combinations thereof.

In some examples, during a training stage prior to a start of play, the safety component of a gesture-based game system may identify a gesture-based game being played and determine a player's gesture range by mapping a range of the player's gestures. In some examples, the mapping may be of a player's gestures (command gestures) in the side-to-side and front-to-back directions. The gesture range can be associated with a particular player, and may be stored for reference during the playing of the game. In some examples, the gesture range may be associated with the particular player's face, game player identification (ID), game player avatar, or any other game player identification or characteristic. The safety component may determine the gesture ranges of other players in a similar manner.

In some examples, the gesture range may depend on the type of gesture-based game. For example, a gesture-based game that requires small player gestures (such as a car racing game where a player is not required to move much or make large gestures to play the game) will typically have smaller gesture ranges for its players when compared to a gesture-based game that requires larger player gestures (such as a tennis game where a player may make large movements and gestures to play the game). The gesture range may also depend on a player's characteristics, such as physical attributes (for example, height, length of arms, etc.), gender, game playing traits (for example, one player may make larger or more violent movements when playing a game as compared to another player who may make smaller or gentler movements when playing the same game), or any other characteristic that may be used to determine the player's gesture range.

When an object moves into or comes within a player's gesture range during play, the safety component may generate an alarm or alert to notify the player of a dangerous condition. The alarm or alert may be an audio alarm from a speaker of the gesture-based game system, or a visual alarm presented on a display of the gesture-based game system, or other light emission. In some examples, the safety component may stop execution (play) of the gesture-based game when an object moves into or comes within a player's gesture range during play.

In some examples, a player's gesture range may be determined by scaling the player's range of motion to the gestures in the command set for the particular gesture-based game. In some examples, the gesture range may be updated during the playing of the gesture-based game. Here, a safety component may track the movement and/or motions of a player during play of the gesture-based game and update the gesture range accordingly.

FIG. 1 schematically shows an illustrative example of an environment where a player is playing a gesture-based game and a spectator is watching the playing of the game in the vicinity of the player, arranged in accordance with at least some embodiments described herein. As depicted in FIG. 1, a player 150 may play a gesture-based game using a gesture-based game system 100. The gesture-based game may be played by recognizing a gesture of player 150. By way of example, but not limitation, the gesture-based game may include a dancing game, a boxing game, a golf game, and the like.

In some embodiments, gesture-based game system 100 may include a game console 110, a camera 120, a display 130 and a speaker 140. Game console 110 may execute a gesture-based game. Although illustrated as discrete components, various components of gesture-based game system 100 may be divided into additional components, combined into fewer components, or eliminated, depending on the desired implementation.

Game console 110 may be configured to run or execute the gesture-based game. By way of example, but not limitation, when player 150 inserts a game, such as, but not limited to, a compact disk (CD) or a game digital versatile disk (DVD), of the gesture-based game into game console 110, game console 110 may start executing the gesture-based game.

Camera 120 may be configured to detect or recognize a person within a predetermined detectable area and recognize the person as player 150 of the game run or executed by game console 110. Camera 120 may be one of a set of input devices of gesture-based game system 100. In some embodiments, camera 120 may detect a movement of player 150 and transmit the detected movement, as an electrical signal, to game console 110. By way of example, but not limitation, camera 120 may include a depth camera, or any other imaging devices which can identify player 150 and/or recognize his/her gestures.

Display 130 may be configured to display the gesture-based game. In some embodiments, display 130 may display a game character, which makes gestures in the gesture-based game that follow gestures that player 150 makes. By way of example, but not limitation, if camera 120 detects a forward movement of player 150, a game character on display 130 may also be displayed as being moved forward, and if camera 120 detects an upward movement of an arm of player 150, an arm of the game character on display 130 may also be displayed as being moved upward. Thus, player 150 may move in a certain direction or move a specific part of the body in a certain direction while watching his/her own game character displayed on display 130. By way of example, display 130 may include, but is not limited to, a liquid crystal display (LCD), a plasma display panel (PDP), a light emitting diode (LED) backlight display device, or any other display device.

Speaker 140 is one of a set of output devices of gesture-based game system 100. Speaker 140 may output background music or sound effects of the gesture-based game as the game proceeds. Speaker 140 may be provided as a part of display 130 as shown in FIG. 1 or as a separate device.

Game console 110 in accordance with at least some embodiments described herein may include a safety component (not shown) configured to prevent a collision between player 150 and an object or another person. In some embodiments, the safety component may detect an object such as a spectator 160 other than player 150. In some embodiments, if there is a risk of a collision between player 150 and spectator 160 during the playing of the game, the safety component may inform player 150 and/or spectator 160 of the risk. By way of example, but not limitation, if player 150 cannot recognize spectator 160 in the vicinity of player 150 while looking at only display 130 displaying the game or if spectator 160 unconsciously moves near player 150 to get a better view of display 130 displaying the game, the safety component may inform player 150 and spectator 160 of a possibility of a collision between player 150 and spectator 160 beforehand, thereby preventing such a collision. In addition to avoiding a collision with spectator 160, embodiments also include avoiding a collision with a pet in the room, or with another player of the gesture-based game. A configuration of the safety component will be described in detail with reference to FIG. 2.

Figure 2:
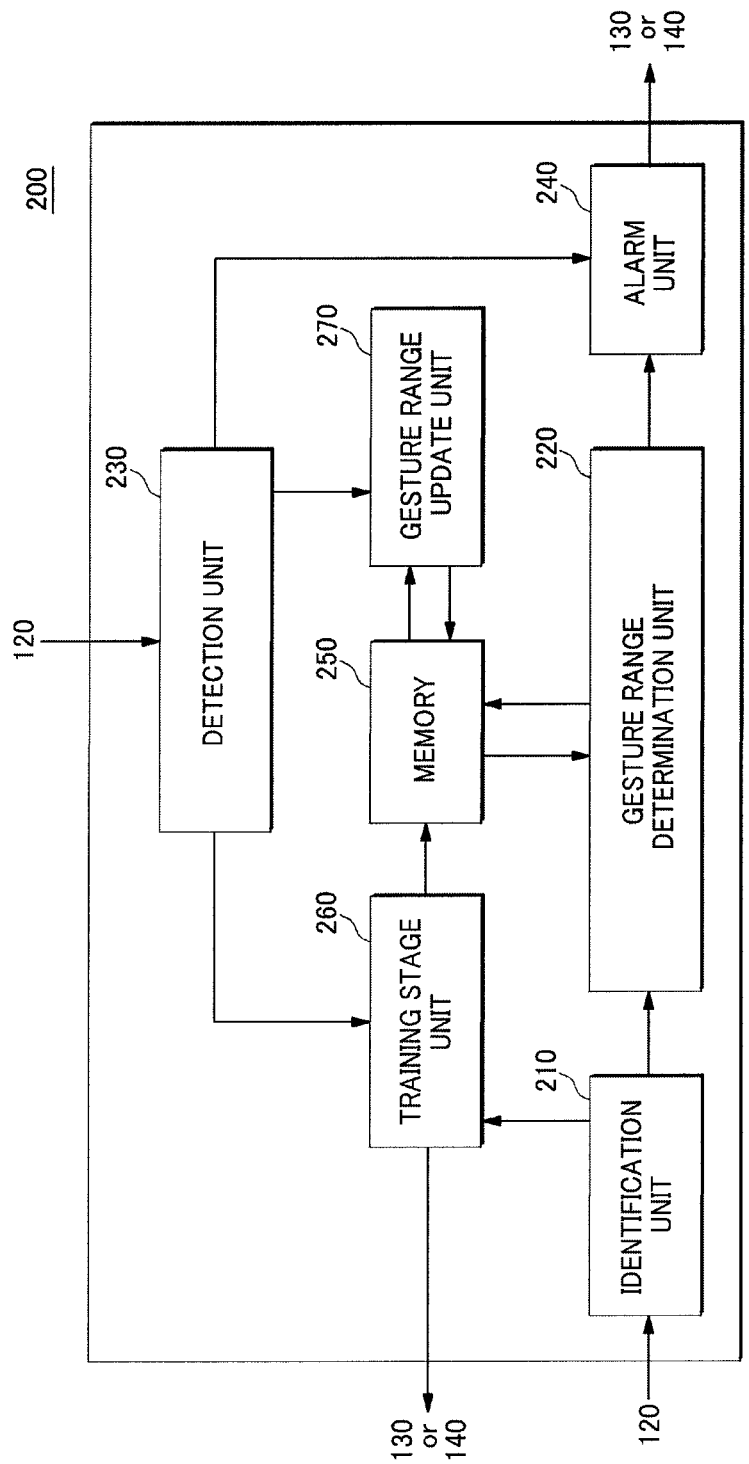
FIG. 2 shows a schematic block diagram illustrating an example of a safety component of a gesture-based game system.

FIG. 2 shows a schematic block diagram illustrating an example of a safety component for a gesture-based game provided by gesture-based game system 100, arranged in accordance with at least some embodiments described herein. As depicted, a safety component 200 may include an identification unit 210, a gesture range determination unit 220, a detection unit 230, and an alarm unit 240. Although illustrated as discrete components, various components may be divided into additional components, combined into fewer components, or eliminated, depending on the desired implementation.

Identification unit 210 may be configured to identify a gesture-based game which is run or executed on gesture-based game system 100. By way of example, but not limitation, identification unit 210 may identify the gesture-based game based on information recorded in a storage medium such as a CD, a DVD or a semiconductor memory which stores execution codes of the gesture-based game.

In some embodiments, identification unit 210 may also identify player 150 who plays the gesture-based game. By way of example, but not limitation, identification unit 210 may identify player 150 based on a user ID or an avatar input to gesture-based game system 100 by player 150 through an input device (not shown). By way of example, but not limitation, the input device may include a keypad, a mouse, a touch screen, a touchpad, a keyboard, a trackball, or a joystick. In some embodiments, identification unit 210 may also recognize a face of player 150 based on a video signal received from camera 120, thereby identifying player 150. Face recognition has been widely known to one skilled in the art and detailed description thereof will be omitted herein.

Gesture range determination unit 220 may be configured to determine a gesture range. In some embodiments, gesture range determination unit 220 may determine the gesture range associated with an identified gesture-based game. If identification unit 210 identifies the gesture-based game, gesture range determination unit 220 may receive information on the gesture-based game from identification unit 210 and determine a gesture range based on the received information on the gesture-based game. By way of example, but not limitation, if the identified gesture-based game requires a small gesture range (for example, but not limited to, in case of a car racing game), the determined gesture range may be relatively small. Similarly, if the identified gesture-based game requires a large gesture range (for example, but not limited to, in case of a sports game such as a tennis game, a boxing game, or a bowling game), the determined gesture range may be relatively large.

In some embodiments, an initially determined gesture range may be a default gesture range that is associated with the identified gesture-based game. By way of example, but not limitation, in cases where player 150 plays the gesture-based game for the first time, that is, the gesture-based game is executed for player 150 for the first time, gesture range determination unit 220 may determine the default gesture range associated with the identified gesture-based game as a gesture range of the executed gesture-based game.

In some embodiments, gesture range determination unit 220 may determine the gesture range based on identified player 150. If identification unit 210 identifies player 150, gesture range determination unit 220 may receive information on identified player 150 from identification unit 210 and determine a gesture range based on the received information on player 150. By way of example, but not limitation, if identified player 150 is short in height, the determined gesture range may be relatively small. Similarly, if identified player 150 is tall, the determined gesture range may be relatively large.

In some embodiments, gesture range determination unit 220 may determine the gesture range based on the identified gesture-based game and identified player 150. If identification unit 210 identifies the gesture-based game and player 150, gesture range determination unit 220 may receive information on the identified gesture-based game and identified player 150 from identification unit 210 and determine a gesture range based on the received information on the gesture-based game and player 150.

Detection unit 230 may be configured to detect a movement of an object. Herein, the object may include, for example, but not limited to, another person such as spectator 160 or another player, a pet, an article or the like other than player 150. In some embodiments, detection unit 230 may detect a movement of spectator 160 based on a video signal received from camera 120. By way of example, but not limitation, detection unit 230 may detect a back-and-forth movement of spectator 160 as well as an up-and-down movement and a right-and-left movement thereof as viewed from camera 120.

In some embodiments, detection unit 230 may detect a movement of player 150 who plays the gesture-based game. By way of example, but not limitation, detection unit 230 may detect a motion of player 150. In some embodiments, the detected motion may be used to generate a gesture range. Additional details in this regard will be provided below with reference to training stage unit 260.

In some embodiments, detection unit 230 may track a motion of player 150 during the playing of the gesture-based game. The tracked motion may be used to update the gesture range determined by gesture range determination unit 220. Additional details in this regard will be provided below with reference to a gesture range update unit 270.

Alarm unit 240 may be configured to generate an alarm upon, or in response to, a determination that spectator 160 is within the determined gesture range. By way of example, but not limitation, alarm unit 240 may determine whether or not the movement of spectator 160 detected by detection unit 230 is within the gesture range determined by gesture range determination unit 220. If alarm unit 240 determines that the detected movement of spectator 160 is within the determined gesture range, alarm unit 240 may generate an alarm. By way of example, but not limitation, if the position of spectator 160 moves from the outside of the determined gesture range to the inside of the determined gesture range, alarm unit 240 may generate an alarm.

In some embodiments, alarm unit 240 may send a visible alarm message to be displayed on display 130, so that player 150 and/or spectator 160 can see the alarm message displayed on display 130 and pay attention to prevent a collision. Further, alarm unit 240 may send an audible alarm message to be output through speaker 140, so that player 150 and/or spectator 160 can hear the alarm message output through speaker 140 and pay attention to prevent a collision. Additional details regarding alarm unit 240 will be provided below with reference to FIG. 5.

In some embodiments, safety component 200 may further include a memory 250. In some embodiments, memory 250 may be configured to store therein a gesture range associated with the gesture-based game and/or player 150. By way of example, but not limitation, the gesture range determined by gesture range determination unit 220 may be recorded in memory 250 by gesture range determination unit 220. Further, by way of example, but not limitation, gesture range determination unit 220 may read the gesture range associated with the gesture-based game and/or player 150 from memory 250. By way of example, but not limitation, gesture range determination unit 220 may determine a gesture range. Determination of gesture range made by gesture range determination unit 220 will be described in detail with reference to FIG. 4.

In some embodiments, safety component 200 may further include a training stage unit 260. In some embodiments, training stage unit 260 may be configured to generate a gesture range during a training stage of the identified gesture-based game. By way of example, but not limitation, training stage unit 260 may request player 150 of the gesture-based game to make a game playing motion. By way of example, but not limitation, detection unit 230 may detect the motion made by player 150 in response to the request. By way of example, but not limitation, if the gesture-based game is a boxing game, training stage unit 260 may send a message to player 150 to stretch his/her arm through display 130 and/or speaker 140. In response to this message, player 150 may stretch his/her arm. By way of example, but not limitation, camera 120 may capture an image of player 150. Then, detection unit 230 may receive the video signal from camera 120 thereby detecting the motion made by player 150. By way of example, but not limitation, training stage unit 260 may receive the motion of player 150 detected by detection unit 230 and create a gesture range based on the received detected motion.

Further, in some embodiments, the training stage may precede the playing of the gesture-based game. By way of example, but not limitation, if player 150 executes the gesture-based game, identification unit 210 may identify the gesture-based game. Then, training stage unit 260 may execute the training stage associated with the identified gesture-based game prior to the playing of the identified gesture-based game. In this case, player 150 may check how the motion of stretching the arm is displayed on display 130 through the training stage prior to a playing of a boxing game. In some embodiments, gesture range determination unit 220 may measure a motion of player 150 beforehand, so that it may generate a gesture range suitable for the gesture-based game and/or player 150.

In some embodiments, the gesture range generated by training stage unit 260 may be stored in memory 250. By way of example, but not limitation, gesture range determination unit 220 may read the stored gesture range associated with the gesture-based game and/or player 150 from memory 250 and determine a gesture range while the gesture-based game is played.

In some embodiments, safety component 200 may further include a gesture range update unit 270. Gesture range update unit 270 may be configured to update the gesture range based on motion of the identified player 150. By way of example, but not limitation, gesture range update unit 270 may read a gesture range from memory 250. By way of example, but not limitation, gesture range update unit 270 may update the gesture range based on the motion of player 150 detected by detection unit 230 and a gesture range read from memory 250. If the detected motion of player 150 exceeds the gesture range read from memory 250, gesture range update unit 270 may extend the gesture range.

In some embodiments, gesture range update unit 270 may update the gesture range based on a motion of identified player 150 during a playing of the gesture-based game by identified player 150. By way of example, but not limitation, if player 150 plays the gesture-based game, gesture range determination unit 220 may determine a gesture range and store the gesture range in memory 250. By way of example, but not limitation, detection unit 230 may detect a motion of player 150 who plays the gesture-based game. By way of example, but not limitation, gesture range update unit 270 may read the gesture range from memory 250 and update the determined gesture range received from memory 250 based on the detected motion of player 150. Further, in some embodiments, gesture range update unit 270 may store the updated gesture range in memory 250. By way of example, but not limitation gesture range determination unit 220 may read the updated gesture range from memory 250 thereby determining the updated gesture range as a gesture range in real time.

In some embodiments, the updated gesture range may be preserved for subsequent playing of the gesture-based game by identified player 150. By way of example, but not limitation, the gesture range updated by gesture range update unit 270 may be stored in memory 250. If player 150 plays a subsequent playing of the gesture-based game, gesture range determination unit 220 may determine the updated gesture range as a gesture range. Additional details of an update of the gesture range by gesture range update unit 270 will be provided with reference to FIG. 6.

Figure 3:
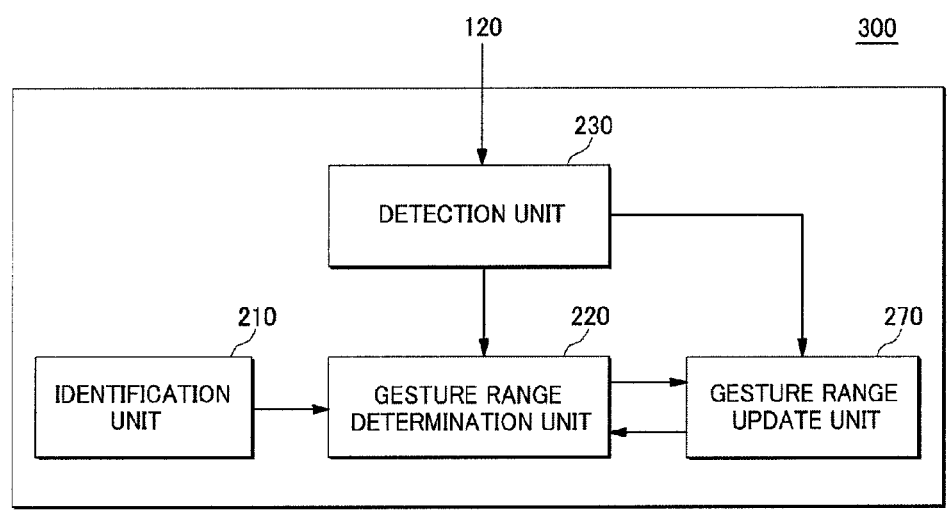
FIG. 3 shows a schematic block diagram illustrating another example of a safety component of a gesture-based game system.

FIG. 3 shows a schematic block diagram illustrating another example of a safety component for a gesture-based game provided by gesture-based game system 100, arranged in accordance with at least some embodiments described herein. As depicted, a safety component 300 may include identification unit 210, gesture range determination unit 220, detection unit 230 and gesture range update unit 270. Although illustrated as discrete components, various components may be divided into additional components, combined into fewer components, or eliminated, depending on the desired implementation.

Identification unit 210 may be configured to identify a type of a gesture-based game which is run or executed on gesture-based game system 100. In some embodiments, identification unit 210 may identify the type of the gesture-based game based on a content type of the gesture-based game. There may be several content types of the gesture-based game, for example, but not limited to, a sports game type, a racing game type, a music/rhythm game type, a role-playing game type, etc. By way of example, but not limitation, identification unit 210 may identify a tennis game or a boxing game as a sports game type, a car racing game or a bike racing game as a racing game type.

In some embodiments, identification unit 210 may identify the type of the gesture-based game based on an identity of the gesture-based game. By way of example, but not limitation, identification unit 210 may identify the gesture-based game based on information (for example, but not limited to, a game ID, a game serial number, and/or game registration information) recorded in a storage medium such as a CD, a DVD or a semiconductor memory which stores execution codes of the gesture-based game.

Gesture range determination unit 220 may be configured to determine a gesture range. In some embodiments, gesture range determination unit 220 may determine the gesture range based on the type of the gesture-based game. By way of example, but not limitation, if the identified type of the gesture-based game requires a small gesture range (for example, but not limited to, in case of a racing game type), the determined gesture range may be relatively small. On the other hand, if the identified type of the gesture-based game requires a large gesture range (for example, but not limited to, in case of a sports game type), the determined gesture range may be relatively large.

In some embodiments, if identification unit 210 identifies the type of the gesture-based game, gesture range determination unit 220 may receive type information on the gesture-based game from identification unit 210 and determine a gesture range based on the received type information.

In some embodiments, an initially determined gesture range may be a default gesture range that is associated with the type of the identified gesture-based game. By way of example, but not limitation, in cases where player 150 plays the gesture-based game for the first time, that is, the gesture-based game is executed for player 150 for the first time, gesture range determination unit 220 may determine the default gesture range associated with the identified type of the gesture-based game as a gesture range of the executed gesture-based game.

Detection unit 230 may be configured to detect a movement of an object relative to the gesture range. As discussed above, the object may include, for example, but not limited to, another person such as spectator 160 or another player, a pet, an article or the like other than player 150. In some embodiments, detection unit 230 may detect a movement of spectator 160 based on a video signal received from camera 120. By way of example, but not limitation, detection unit 230 may detect a back-and-forth movement of spectator 160 as well as an up-and-down movement and a right-and-left movement thereof as viewed from camera 120.

In some embodiments, detection unit 230 may detect a movement and/or a location of spectator 160 within the gesture range. By way of example, but not limitation, if a part of body (e.g., a hand or an arm) of spectator 160 enters the gesture range as spectator 160 moves toward the gesture range, detection unit 230 may detect a movement and/or a location of the entered body of spectator 160 within the gesture range.

In some embodiments, detection unit 230 may track a motion of player 150 during the playing of the gesture-based game. The tracked motion may be used to update the gesture range determined by gesture range determination unit 220. Additional details in this regard will be provided below with reference to gesture range update unit 270.

Gesture range update unit 270 may be configured to update the gesture range to generate an updated gesture range based on motion of the identified player 150 during playing of the gesture-based game by the identified player 150. By way of example, but not limitation, gesture range update unit 270 may receive a gesture range from gesture range determination unit 220. By way of example, but not limitation, gesture range update unit 270 may update the gesture range to generate the updated gesture range based on the motion of player 150 detected by detection unit 230 and the gesture range received from gesture range determination unit 220. If the detected motion of player 150 exceeds the gesture range received from gesture range determination unit 220, gesture range update unit 270 may extend the gesture range to generate the updated gesture range.

FIG. 4 schematically shows illustrative examples of determining a gesture range, arranged in accordance with at least some embodiments described herein. As discussed above, gesture range determination unit 220 may determine the gesture range associated with the identified gesture-based game and/or player 150. The gesture range associated with the identified gesture-based game and/or player 150 may be determined to have various shapes. In some embodiments, a gesture range 400 may be determined to be a rectangular two-dimensional plane. As depicted in FIG. 4(A), gesture range 400 may be represented by a two-dimensional Cartesian coordinate system including x-axis and y-axis where player 150 moves right or left along the x-axis and forward or backward along the y-axis. In such embodiments, gesture range 400 may be defined by a maximum right position $x(+)$ 410, a maximum left position $x(-)$ 420, a maximum forward position $y(+)$ 430 and a maximum backward position $y(-)$ 440 of player 150 in the two-dimensional Cartesian coordinate system. In some embodiments, gesture range 460 may be determined to be a circular two-dimensional plane. As depicted in FIG. 4(B), gesture range 460 is defined by a reference position 470 and a maximum radius 480 of player 150 in two-dimensional Cartesian coordinate system.

Although FIG. 4 illustrates that the gesture range is defined as the two-dimensional plane, it is noted that the gesture range may be determined to be a three-dimensional volume which may be further defined by, for example, but not limited to, a maximum high position and a maximum low position. Further, although FIG. 4 illustrates that the gesture range is rectangular or circular, it is noted that gesture range may be defined as various shapes, e.g., elliptical shape where one axis is more likely than another axis to experience a collision with an object within gesture range. However, an example in which the gesture range is defined as a two-dimensional plane will be described below for simplicity.

Meanwhile, in order to determine a gesture range, gesture range determination unit 220 may set reference positions 450 and 470 of gesture ranges 400 and 460, respectively. In some embodiments, gesture range determination unit 220 may set reference positions 450 and 470 of gesture ranges 400 and 460 based on a current position of player 150. By way of example, but not limitation, gesture range determination unit 220 may set reference positions 450 and 470 of gesture ranges 400 and 460 based on the position of player 150 detected by detection unit 230. Gesture range determination unit 220 may determine gesture ranges 400 and 460 based on set reference positions 450 and 470.

In some embodiments, gesture range determination unit 220 may set reference positions 450 and 470 of gesture ranges 400 and 460 based on an area detectable by detection unit 230. By way of example, but not limitation, gesture range determination unit 220 may set reference positions 450 and 470 of the gesture ranges 400 and 460 based on a center of an area detectable by detection unit 230 and may determine gesture ranges 400 and 460 based on set reference positions 450 and 470.

FIG. 5 schematically shows an illustrative example of detecting a movement of a spectator, arranged in accordance with at least some embodiments described herein. As depicted in FIG. 5, a gesture range 500 is defined by a maximum right position x(+) 510, a maximum left position x(−) 520, a maximum forward position y(+) 530 and a maximum backward position y(−) 540. By way of example, but not limitation, player 150 plays a gesture-based game within gesture range 500 and spectator 160 watches player 150 playing the game out of gesture range 500.

As discussed above, detection unit 230 may detect a movement of spectator 160 in the vicinity of player 150. Alarm unit 240 may generate an alarm upon, or in response to, determination that spectator 160 is within gesture range 500. By way of example, but not limitation, if a part of body (e.g., a hand or an arm) of spectator 160 enters gesture range 500 as spectator 160 moves toward gesture range 500, alarm unit 240 may generate an alarm.

In some embodiments, detection unit 230 may detect (x, y) coordinates of spectator 160, where 'x' represents position of spectator 160 in the direction of x-axis and 'y' represents position of spectator 160 in the direction of y-axis in a two-dimensional Cartesian coordinate system. By way of example, but not limitation, x-axis may be parallel to a line where spectator 160 moves in right and left direction and y-axis may be parallel to a line where spectator 160 moves in forward and backward direction. By way of example, but not limitation, detection unit 230 may detect (x, y) coordinates of spectator 160 from a video signal received from camera 120. Alarm unit 240 may determine whether or not at least part of (x, y) coordinates of spectator 160 detected by detection unit 230 are within (x, y) coordinates of gesture range 500 determined by gesture range determination unit 220. By way of example, but not limitation, if alarm unit 240 determines that at least part of (x, y) coordinates of spectator 160 are within (x, y) coordinates of gesture range 500, alarm unit 240 may give an alarm to player 150 and/or spectator 160.

FIG. 6 schematically shows illustrative examples of updating a gesture range, arranged in accordance with at least some embodiments described herein. By way of example, but not limitation, even if spectator 160 in the vicinity of player 150 does not enter the determined gesture range from the outside, if player 150 gets out of the determined gesture range, player 150 may collide with spectator 160. Thus, in order to prevent such a collision, the gesture range needs to be changed.

As discussed above, gesture range update unit 270 may update gesture range based on the motion of identified player 150 during the playing of the gesture-based game by identified player 150. By way of example, but not limitation, detection unit 230 may track a motion of player 150. Further, if the tracked motion of player 150 exceeds the gesture range, gesture range update unit 270 may extend the gesture range. By way of example, but not limitation, the update gesture range may be stored in memory 250 and read by gesture range determination unit 220.

In some embodiments, gesture range update unit 270 may update at least a part of the gesture range. By way of example, but not limitation, when gesture range 600 is defined by a maximum right position x(+) 610, a maximum left position x(−) 620, a maximum forward position y(+) 630 and a maximum backward position y(−) 640, as depicted in FIG. 6(A), each of maximum right position x(+) 610, maximum left position x(−) 620, maximum forward position y(+) 630 and maximum backward position y(−) 640 may be updated. By way of example, but not limitation, if player 150 moves to the right and exceeds maximum right position x(+) 610, gesture range update unit 270 may update only maximum right position x(+) 610 to an extended maximum right position x(+) 612, thereby extending gesture range 600 to gesture range 602. Consequently, extended gesture range 602 has an area extended to the right from gesture range 600.

In some embodiments, gesture range update unit 270 may update the whole gesture range. By way of example, but not limitation, when gesture range 660 is defined by a reference position 670 and a maximum radius 680, if player 150 moves to the right and exceeds the gesture range, gesture range update unit 270 may update maximum radius 680 thereby extending gesture range 660 to gesture range 662. Consequently, extended gesture range 662 has an area obtained by extending the whole gesture range 660.

Meanwhile, in some embodiments, the gesture range is not updated if a predetermined condition is satisfied. By way of example, but not limitation, if player 150 stops playing the gesture-based game or if player 150 is not detected by detection unit 230, the gesture range is not updated. If the gesture range is updated even when player 150 gets out of the gesture range intentionally to do something else during the playing of the game, the updated gesture range may become too large. Thus, even if player 150 is away enough from spectator 160 to avoid a collision with spectator 160, alarm unit 240 may generate an alarm to inform player 150 and/or spectator 160 of a risk of the collision between player 150 and spectator 160.

Figure 7:
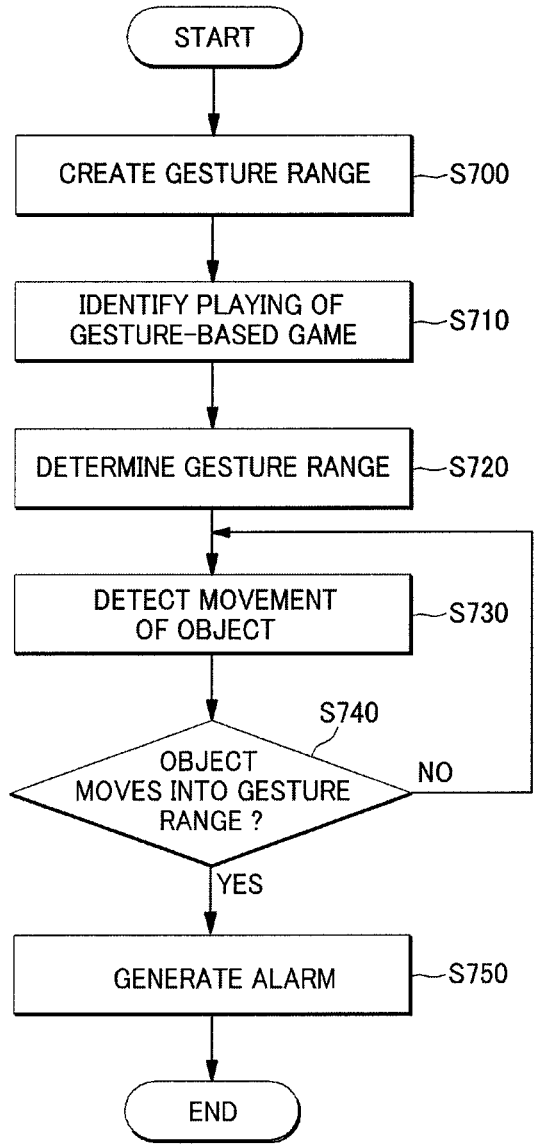
FIG. 7 shows an example flow diagram of a process for generating an alarm based on a gesture range and a movement of an object.

FIG. 7 shows an example flow diagram of a process for generating an alarm based on a gesture range and a movement of an object, arranged in accordance with at least some embodiments described herein. The method in FIG. 7 could the implemented using safety component 200 including identification unit 210, gesture range determination unit 220, detection unit 230, alarm unit 240, memory 250, training stage unit 260 and gesture range update unit 270, or safety component 300 including identification unit 210, gesture range determination unit 220, detection unit 230 and gesture range update unit 270 discussed above. An example process may include one or more operations, actions, or functions as illustrated by one or more blocks S700, S710, S720, S730, S740 and/or S750. Although illustrated as discrete blocks, various blocks may be divided into additional blocks, combined into fewer blocks, or eliminated, depending on the desired implementation. Processing may begin at block S700.

At block S700, a safety component may create a gesture range. By way of example, but not limitation, the safety component may request a player of a gesture-based game to make a game playing motion. Then, the safety component may detect the motion made by the player in response to the request and then, the safety component may create the gesture range based on the detected motion made by the player. By way of example, but not limitation, the safety component may create the gesture range prior to the playing of the gesture-based game. By way of example, but not limitation, the gesture range is created during a previous playing of the gesture-based game. Processing may continue from block S700 to block S710.

At block S710, the safety component may identify a playing of a gesture-based game. The safety component may identify the playing of the gesture-based game by reading out an execution code of gesture-based game which is stored in a storage medium such as a CD, a DVD or a semiconductor memory. In some embodiments, the safety component may further identify the playing gesture-based game and the player who plays the gesture-based game. By way of example, but not limitation, the safety component may identify a player based on a user ID or an avatar input to gesture-based game system 100 by the player. Processing may continue from block S710 to block S720.

At block S720, the safety component may determine a gesture range. By way of example, but not limitation, the safety component may determine the gesture range associated with the identified gesture-based game. By way of example, but not limitation, if the identified gesture-based game requires a small gesture range (for example, but not limited to, in case of a car racing game), the determined gesture range may be relatively small. Similarly, if the identified gesture-based game requires a large gesture range (for example, but not limited to, in case of a sports game such as a tennis game, a boxing game or a bowling game), the determined gesture range may be relatively large. In some embodiments, the gesture range is a default gesture range that is associated with the identified gesture-based game. By way of example, but not limitation, the safety component may determine the gesture range associated with a specific player, who is identified at block S710. Processing may continue from block S720 to block S730.

At block S730, the safety component may detect a movement of an object. By way of example, but not limitation, the safety component may detect the movement of the object during the playing of the gesture-based game. By way of example, but not limitation, the safety component may detect a back-and-forth movement of the object as well as an up-and-down movement and a right-and-left movement thereof as viewed from camera 120. Processing may continue from block S730 to block S740.

At block S740, the safety component may determine whether the object moves into the gesture range. By way of example, but not limitation, the safety component may determine whether the object moves into the gesture range during the playing of the gesture-based game. If the object moves into the gesture range, processing may continue from block S740 to block S750. Otherwise, processing may continue from block S740 back to block S730.

At block S750, the safety component may generate an alarm. By way of example, but not limitation, the safety component may generate the alarm when determining the object moves into the gesture range during the playing of the gesture-based game. By way of example, but not limitation, the safety component may generate the alarm by displaying a visible warning message on a display and/or producing an audible warning message through a speaker. By way of example, but not limitation, the safety component may generate the alarm by terminating the playing of the gesture-based game.

Figure 8:
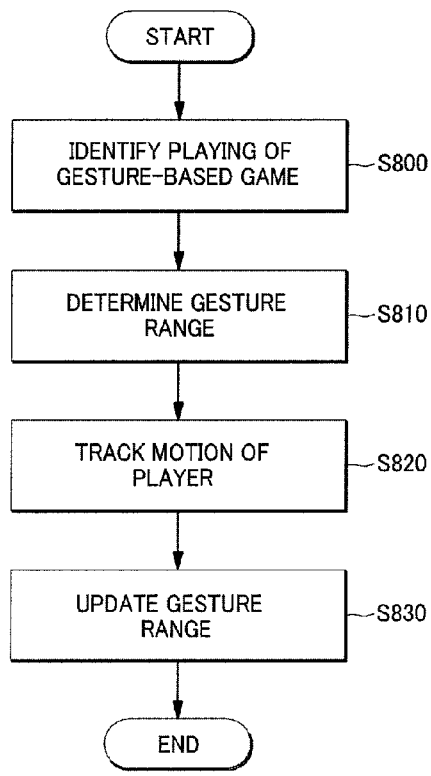
FIG. 8 shows an example flow diagram of a process for updating a gesture range based on a tracked motion of a player.

FIG. 8 shows an example flow diagram of a process for updating a gesture range based on a tracked motion of a player, arranged in accordance with at least some embodiments described herein. The method in FIG. 8 could be implemented using safety component 200 including identification unit 210, gesture range determination unit 220, detection unit 230, alarm unit 240, memory 250, training stage unit 260 and gesture range update unit 270, or safety component 300 including identification unit 210, gesture range determination unit 220, detection unit 230 and gesture range update unit 270 discussed above. An example process may include one or more operations, actions, or functions as illustrated by one or more of blocks S800, S810, S820 and/or S830. Although illustrated as discrete blocks, various blocks may be divided into additional blocks, combined into fewer blocks, or eliminated, depending on the desired implementation. Processing may begin at block S800.

At block S800, a safety component may identify a playing of a gesture-based game. The safety component may identify the playing of the gesture-based game by reading out an execution code of gesture-based game which is stored in a storage medium such as a CD, a DVD or a semiconductor memory. By way of example, but not limitation, the safety component may further identify the playing gesture-based game and the player who plays the gesture-based game. Processing may continue from block S800 to block S810.

At block S810, the safety component may determine a gesture range. The safety component may determine a gesture range associated with the identified gesture-based game and the identified player. By way of example, but not limitation, if the identified gesture-based game is a dynamic sport games such as a boxing game and the identified player is tall, the determined gesture range may be large. Processing may continue from block S810 to block S820.

At block S820, the safety component may track a motion of the player. By way of example, but not limitation, the safety component may track a motion of the player during a playing of the gesture-based game. By way of example, but not limitation, the safety component may detect (x, y) coordinates of the player, where 'x' represents position of the player in the direction of x-axis and 'y' represents position of the player in the direction of y-axis in a two-dimensional Cartesian coordinate system. By way of example, but not limitation, x-axis may be parallel to a line where the player moves to the right and/or left direction and y-axis may be parallel to a line where the player moves to the forward and/or backward direction. Processing may continue from block S820 to block S830.

At block S830, the safety component may update the gesture range. By way of example, but not limitation, the safety component may update the gesture range to generate the updated gesture range based on the tracked motion of the player. By way of example, but not limitation, the safety component may extend the gesture range if the tracked motion of the player exceeds the gesture range. By way of example, but not limitation, the safety component may update at least a part of the gesture range.

Figure 9:
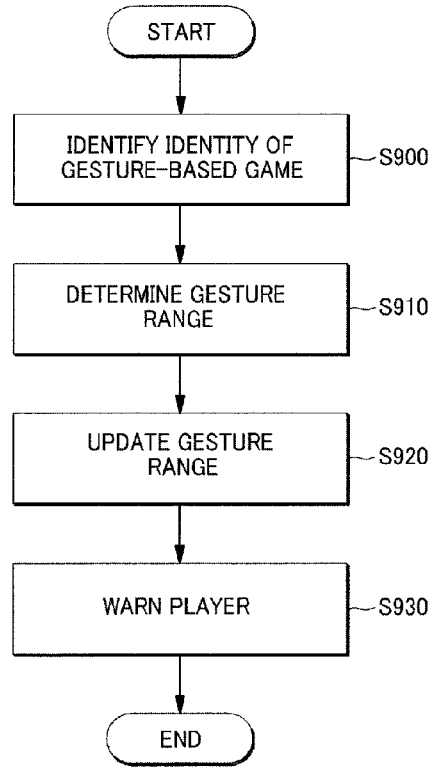
FIG. 9 shows an example flow diagram of a process for warning a player in response to detecting an object within a gesture range.

FIG. 9 shows an example flow diagram of a process for warning a player in response to detecting an object within a gesture range, arranged in accordance with at least some embodiments described herein. The method in FIG. 9 could be implemented using safety component 200 including identification unit 210, gesture range determination unit 220, detection unit 230, alarm unit 240, memory 250, training stage unit 260 and gesture range update unit 270, or safety component 300 including identification unit 210, gesture range determination unit 220, detection unit 230 and gesture range update unit 270 discussed above. An example process may include one or more operations, actions, or functions as illustrated by one or more blocks S900, S910, S920 and/or S930. Although illustrated as discrete blocks, various blocks may be divided into additional blocks, combined into fewer blocks, or eliminated, depending on the desired implementation. Processing may begin at block S900.

At block S900, the safety component may identify an identity of a gesture-based game. By way of example, but not limitation, the safety component may identify the identity of the gesture-based game being played on a gesture-based game system 100. In some embodiments, the safety component may identify the identity of the gesture-based game by reading out a game ID, a game serial number, and/or game registration information, etc. of the gesture-based game, which are stored in a storage medium such as a CD, a DVD or a semiconductor memory. Processing may continue from block S900 to block S910.

At block S910, the safety component may determine a gesture range. By way of example, but not limitation, the safety component may determine the gesture range of a player associated with the identified gesture-based game based on the identity of the gesture-based game. By way of example, but not limitation, if the identified identity of the gesture-based game requires a small gesture range (for example, but not limited to, in case of a car racing game), the determined gesture range may be relatively small. Similarly, if the identified identity of the gesture-based game requires a large gesture range (for example, but not limited to, in case of a sports game such as a tennis game, a boxing game or a bowling game), the determined gesture range may be relatively large. In some embodiments, the gesture range is a default gesture range that is associated with the identified identity of the gesture-based game. Processing may continue from block S910 to block S920.

At block S920, the safety component may update the gesture range. By way of example, but not limitation, the safety component may update the gesture range to generate an updated gesture range associated with a motion of the player. In some embodiments, the safety component may track the motion of the player. By way of example, but not limitation, the safety component may detect (x, y) coordinates of the player, where 'x' represents position of the player in the direction of x-axis and 'y' represents position of the player in the direction of y-axis in a two-dimensional Cartesian coordinate system. By way of example, but not limitation, x-axis may be parallel to a line where the player moves to the right and/or left direction and y-axis may be parallel to a line where the player moves to the forward and/or backward direction. In some embodiments, the safety component may update the gesture range based on the motion of the player. By way of example, but not limitation, the safety component may extend the gesture range if the tracked motion of the player exceeds the gesture range. By way of example, but not limitation, the safety component may update at least a part of the gesture range. Processing may continue from block S920 to block S930.

At block S930, the safety component may warn the player. By way of example, but not limitation, the safety component may warn the player in response to detecting a location and/or a movement of an object within the gesture range. In some embodiments, the safety component may detect whether the location and/or the movement of the object is within the gesture range. By way of example, but not limitation, if safety component detects the location and/or the movement of the object within the gesture range, the safety component may warn the player. In some embodiments, the safety component may warn the player with at least one of a visual alert or an auditory alert when detecting the location of the object within the gesture range. By way of example, but not limitation, the safety component may generate the alarm by displaying a visible warning message on a display and/or producing an audible warning message through a speaker. By way of example, but not limitation, the safety component may generate the alarm by terminating the playing of the gesture-based game.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 10:
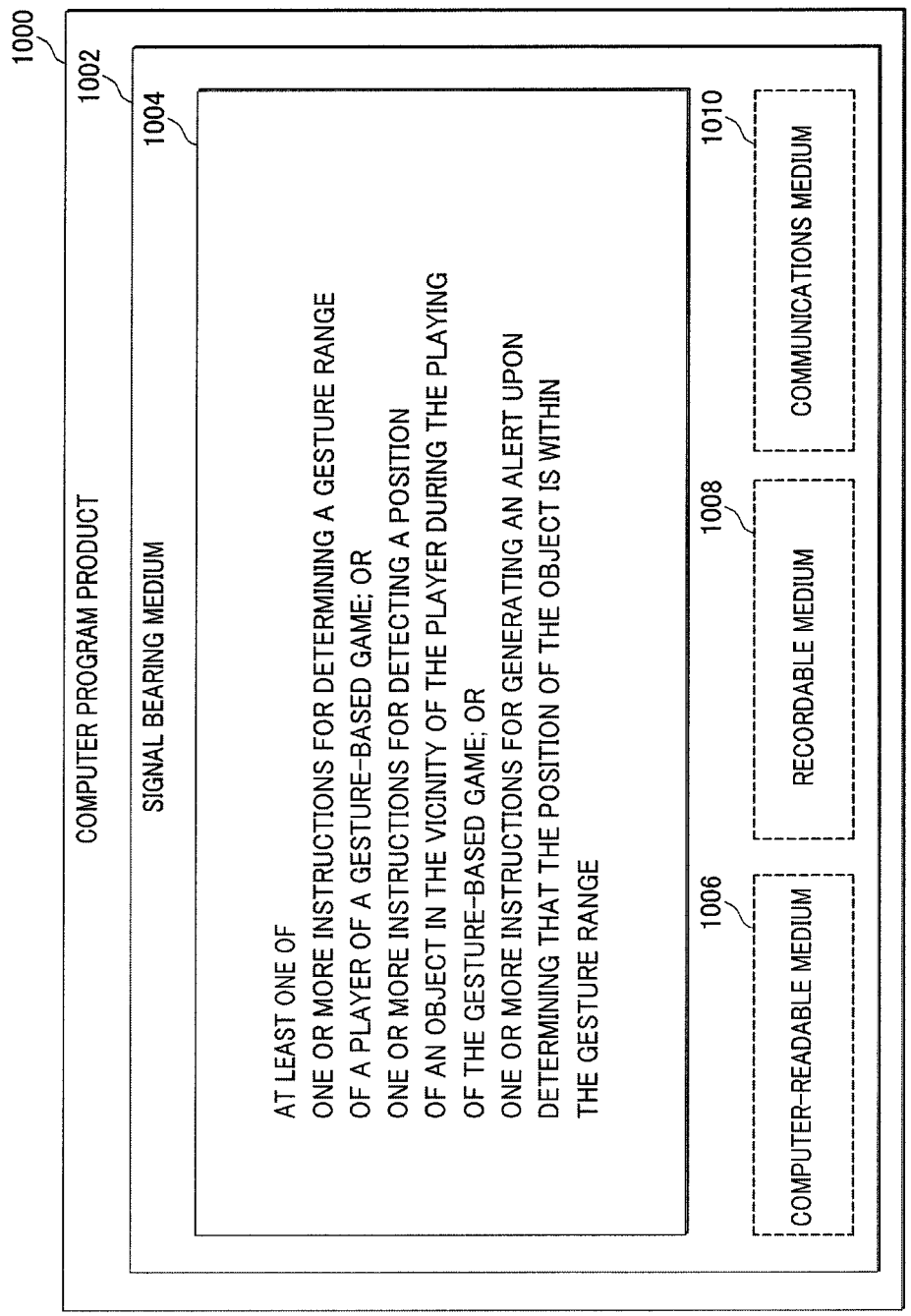
FIG. 10 illustrates a computer program product that can be utilized to provide a safety scheme for a gesture-based game.

FIG. 10 illustrates a computer program product 1000 that can be utilized to provide a safety scheme for a gesture-based game, arranged in accordance with at least some embodiments described herein. Program product 1000 may include a signal bearing medium 1002. Signal bearing medium 1002 may include one or more instructions 1004 that, when executed by, for example, a processor, may provide the functionality described above with respect to FIGS. 1-9. By way of example, instructions 1004 may include: one or more instructions for determining a gesture range of a player of a gesture-based game; one or more instructions for detecting a position of an object in the vicinity of the player during the playing of the gesture-based game; or one or more instructions for generating an alert upon determining that the position of the object is within the gesture range. Thus, for example, referring to FIG. 2, safety component 200 may undertake one or more of the blocks shown in FIG. 7 in response to instructions 1004.

In some implementations, signal bearing medium 1002 may encompass a computer-readable medium 1006, such as, but not limited to, a hard disk drive, a CD, a DVD), a digital tape, memory, etc. In some implementations, signal bearing medium 1002 may encompass a recordable medium 1008, such as, but not limited to, memory, read/write (RAY) CDs, R/W DVDs, etc. In some implementations, signal bearing medium 1002 may encompass a communications medium 1010, such as, but not limited to, a digital and/or an analog communication medium (e.g., a fiber optic cable, a waveguide, a wired communications link, a wireless communication link, etc.). Thus, for example, program product 1000 may be conveyed to one or more modules of safety component 200 by an RF signal bearing medium 1002, where the signal bearing medium 1002 is conveyed by a wireless communications medium 1010 (e.g., a wireless communications medium conforming with the IEEE 802.11 standard).

Figure 11:
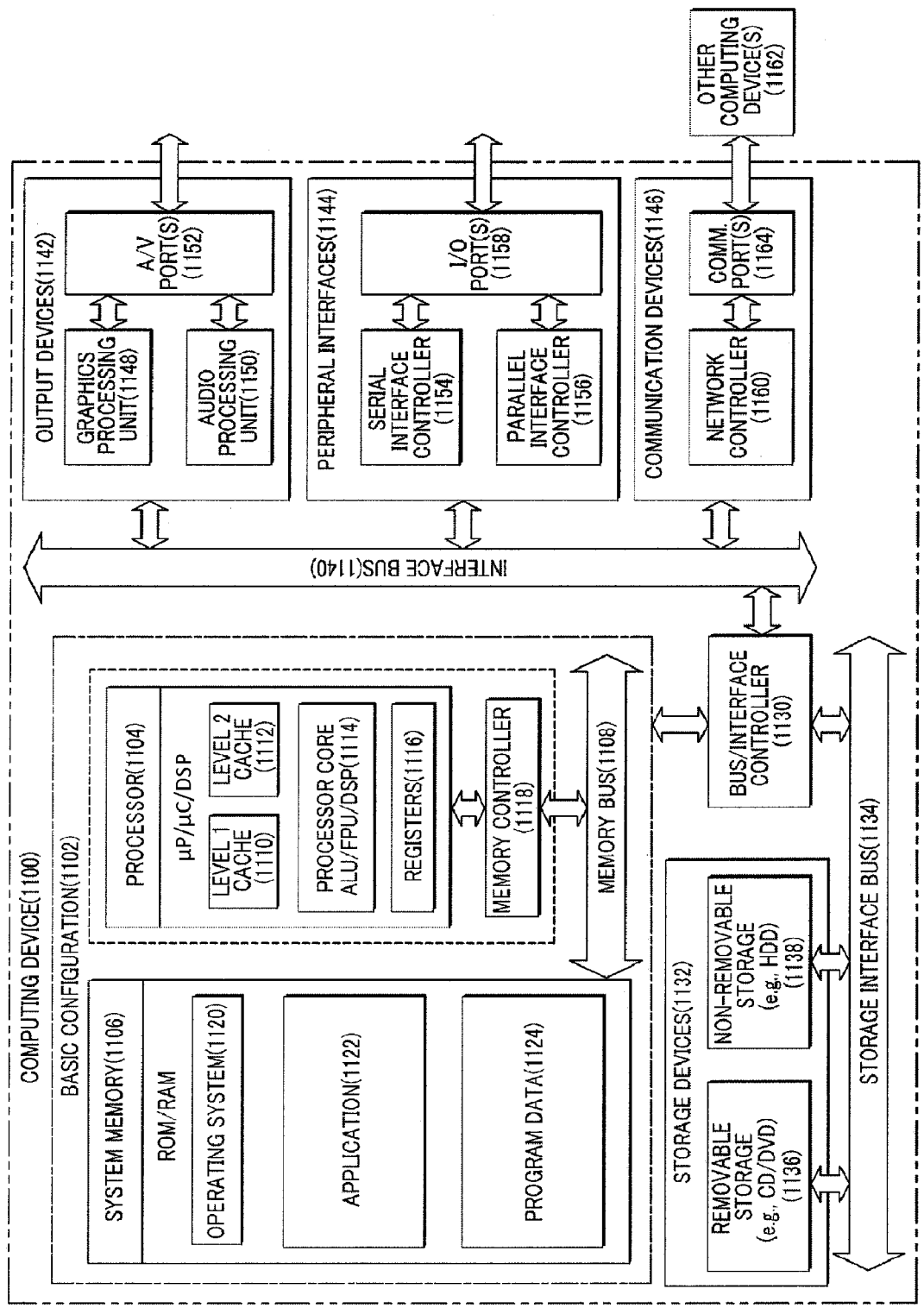
FIG. 11 is a block diagram illustrating an example computing device that can be utilized to provide a safety scheme for a gesture-based game, all arranged in accordance with at least some embodiments described herein.

FIG. 11 is a block diagram illustrating an example computing device 1100 that can be utilized to provide a safety scheme for a gesture-based game, arranged in accordance with at least some embodiments described herein. In a very basic configuration 1102, computing device 1100 typically includes one or more processors 1104 and a system memory 1106. A memory bus 1108 may be used for communicating between processor 1104 and system memory 1106.

Depending on the desired configuration, processor 1104 may be of any type including but not limited to a microprocessor (µP), a microcontroller (µC), a digital signal processor (DSP), or any combination thereof. Processor 1104 may include one or more levels of caching, such as a level one cache 1110 and a level two cache 1112, a processor core 1114, and registers 1116. An example processor core 1114 may include an arithmetic logic unit (ALU), a floating point unit (FPU), a digital signal processing core (DSP Core), or any combination thereof. An example memory controller 1118 may also be used with processor 1104, or in some implementations memory controller 1118 may be an internal part of processor 1104.

Depending on the desired configuration, system memory 1106 may be of any type including but not limited to volatile memory (such as RAM), non-volatile memory (such as ROM, flash memory, etc.) or any combination thereof. System memory 1106 may include an operating system 1120, one or more applications 1122, and program data 1124.

Computing device 1100 may have additional features or functionality, and additional interfaces to facilitate communications between basic configuration 1102 and any required devices and interfaces. For example, a bus/interface controller 1130 may be used to facilitate communications between basic configuration 1102 and one or more data storage devices 1132 via a storage interface bus 1134. Data storage devices 1132 may be removable storage devices 1136, non-removable storage devices 1138, or a combination thereof.

Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 1106, removable storage devices 1136 and non-removable storage devices 1138 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 1100. Any such computer storage media may be part of computing device 1100.

Computing device 1100 may also include an interface bus 1140 for facilitating communication from various interface devices (e.g., output devices 1142, peripheral interfaces 1144, and communication devices 1146) to basic configuration 1102 via bus/interface controller 1130. Example output devices 1142 include a graphics processing unit 1148 and an audio processing unit 1150, which may be configured to communicate to various external devices such as a display or speakers via one or more A/V ports 1152. Example peripheral interfaces 1144 include a serial interface controller 1154 or a parallel interface controller 1156, which may be configured to communicate with external devices such as input devices (e.g., keyboard, mouse, pen, voice input device, touch input device, etc.) or other peripheral devices (e.g., printer, scanner, etc.) via one or more I/O ports 1158. An example communication device 1146 includes a network controller 1160, which may be arranged to facilitate communications with one or more other computing devices 1162 over a network communication link via one or more communication ports 1164.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 1100 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 1100 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

The invention claimed is:

1. An apparatus comprising:
   a detection unit configured to:
      detect a range of motion of a player associated with a gesture-based game, and
      detect a movement of an object;
   an identification unit configured to:
      identify the gesture-based game, and
      provide information associated with the identified gesture-based game to a training stage unit;
   the training stage unit configured to:
      receive the detected range of motion of the player, wherein the detected range of motion is in at least a horizontal plane from the detection unit,
      receive the information associated with the identified gesture-based game, and
      determine a gesture range of the player based on at least the received detected range of motion and the information associated with the identified gesture-based game, wherein the determined gesture range of the player identifies a maximum radius of the player; and
   an alarm unit configured to generate an alarm in response to a determination that the movement of the object is within the determined gesture range.

2. The apparatus of claim 1, further comprising a gesture range update unit configured to update the determined gesture range to generate an updated gesture range based on gameplay motion of the player of the gesture-based game.

3. The apparatus of claim 2, wherein the updated gesture range is preserved for subsequent playing of the gesture-based game by the player.

4. The apparatus of claim 1, further comprising a gesture range determination unit configured to determine a default gesture range that is associated with the gesture-based game.

5. The apparatus of claim 1, wherein the determined gesture range is determined during a training stage of the gesture-based game.

6. The apparatus of claim 5, wherein the training stage precedes playing the gesture-based game.

7. A method comprising:
   detecting a range of motion of a player associated with a gesture-based game;
   identifying the gesture-based game;
   providing information associated with the identified gesture-based game;
   determining a gesture range of the player based on at least the detected range of motion of the player and the information associated with the identified gesture-based game, wherein the detected range of motion is in at least a horizontal plane, and wherein the determined gesture range of the player identifies a maximum radius of the player;
   detecting a movement of an object during playing of the gesture-based game;
   determining that the object has moved into the determined gesture range during the playing of the gesture-based game; and
   generating an alert in response to the determining that the object has moved into the determined gesture range during the playing of the gesture-based game.

8. The method of claim 7, further comprising:
   tracking a motion of the player during the playing of the gesture-based game; and
   updating the determined gesture range based on the tracked motion of the player.

9. The method of claim 7, further comprising
   requesting the player of the gesture-based game to make a game playing motion.

10. The method of claim 7, wherein the determining the gesture range of the player is performed prior to the playing of the gesture-based game.

11. The method of claim 7, further comprising storing a previously determined gesture range from a previous playing of the gesture-based game.

12. The method of claim 7, wherein the generating the alert includes displaying a warning message.

13. The method of claim 7, wherein the generating the alert includes terminating the playing of the gesture-based game.

14. The method of claim 7, further comprising identifying, by a safety component of a gesture-based game system, the playing of the gesture-based game.

15. A non-transitory computer-readable storage medium having stored thereon computer-executable instructions that, in response to execution, cause a system to perform operations, comprising:
   detecting a range of motion of a player associated with a gesture-based game;
   identifying the gesture-based game;
   providing information associated with the identified gesture-based game;
   determining a gesture range of the player based on at least the detected range of motion of the player and the information associated with the identified gesture-based game, wherein the detected range of motion is in at least a horizontal plane, and wherein the determined gesture range of the player identifies a maximum radius of the player;

detecting a position of an object in a vicinity of the player during playing of the gesture-based game; and generating an alert in response to determining that the position of the object is within the determined gesture range.

16. The non-transitory computer-readable storage medium of claim 15, wherein the determining the gesture range includes determining the gesture range prior to the playing of the gesture-based game.

17. The non-transitory computer-readable storage medium of claim 15, further comprising storing a previous gesture range from a prior playing of the gesture-based game.

18. The non-transitory computer-readable storage medium of claim 15, the operations further comprising:

tracking a game playing motion of the player; and updating the determined gesture range according to the game playing motion of the player.

19. The non-transitory computer-readable storage medium of claim 15, the operations further comprising identifying, by a safety component, the playing of the gesture-based game.

20. A system, comprising:

means for detecting a range of motion of a player associated with a gesture-based game;

means for identifying the gesture-based game;

means for providing information associated with the identified gesture-based game;

means for determining a gesture range of the player based on at least the detected range of motion of the player and the information associated with the identified gesture-based game, wherein the detected range of motion is in at least a horizontal plane, and wherein the determined gesture range of the player identifies a maximum radius of the player;

means for determining that an object is located within the determined gesture range during playing of the gesture-based game; and means for generating an alert in response to an output from the means for determining indicating that the object is located within the determined gesture range.

21. The system of claim 20, further comprising means for identifying the playing of the gesture-based game.

22. An apparatus, comprising:

an identification unit configured to identify a gesture-based game and a player;

a gesture range determination unit configured to:

determine a gesture range of the identified player based on at least the identified gesture-based game and body dimension information associated with the player, wherein the determined gesture range of the player identifies a maximum radius of the player; and a detection unit configured to detect a movement of an object relative to the gesture range.

23. The apparatus of claim 22, further comprising a gesture range. update unit configured to update the determined gesture range to generate an updated gesture range based on motion of the identified player during playing of the gesture-based game by the identified player.

24. The apparatus of claim 22, further comprising a gesture range determination configured to determine a default gesture range that is associated with a type of the gesture-based game.

25. A method, comprising:

identifying a player and an identity of a gesture-based game being played by the identified player on a gesture-based game system;

determining a gesture range of the identified player based on at least the identified gesture-based game and body dimension information associated with the player, wherein the determined gesture range of the player identifies a maximum radius of the player; and warning the identified player with at least one of a visual alert or an auditory alert in response to detecting a location of an object within the gesture range.

26. The method of claim 25, further comprising:

tracking a motion of the identified player; and updating the gesture range based on the tracked motion of the identified player.

27. An apparatus comprising:

a detection unit configured to:

detect a range of motion of a player associated with a gesture-based game, and detect a movement of an object;

an identification unit configured to:

identify the gesture-based game, and provide information associated with the identified gesture-based game to a training stage unit;

the training stage unit configured to:

receive the detected range of motion of the player in at least a horizontal plane from the detection unit, receive the information associated with the identified gesture-based game, and determine a gesture range of the player based on at least a center of an area detectable by the detection unit and the received information associated with the identified gesture-based game; and an alarm unit configured to generate an alarm in response to a determination that the movement of the object is within the determined gesture range.

* * * * *

UNITED STATES PATENT AND TRADEMARK OFFICE
CERTIFICATE OF CORRECTION

| | | |
|---|---|---|
| PATENT NO. | : 9,266,019 B2 | Page 1 of 1 |
| APPLICATION NO. | : 13/511844 | |
| DATED | : February 23, 2016 | |
| INVENTOR(S) | : Kim | |

It is certified that error appears in the above-identified patent and that said Letters Patent is hereby corrected as shown below:

IN THE SPECIFICATION

In Column 1, Line 8, delete "§371" and insert -- § 371 --, therefor.

In Column 2, Line 17, delete "BRIEF DESCRIPTION OF FIGURES" and insert -- BRIEF DESCRIPTION OF THE FIGURES --, therefor.

In Column 12, Lines 29-30, delete "could the" and insert -- could be --, therefor.

In Column 16, Line 20, delete "(RAY)" and insert -- (R/W) --, therefor.

Signed and Sealed this
Twenty-fourth Day of May, 2016

Michelle K. Lee
*Director of the United States Patent and Trademark Office*